Feb. 26, 1924.
T. YAMAMOTO
1,485,006
INDUCTION SYNCHRONOUS MOTOR
Filed March 2, 1923
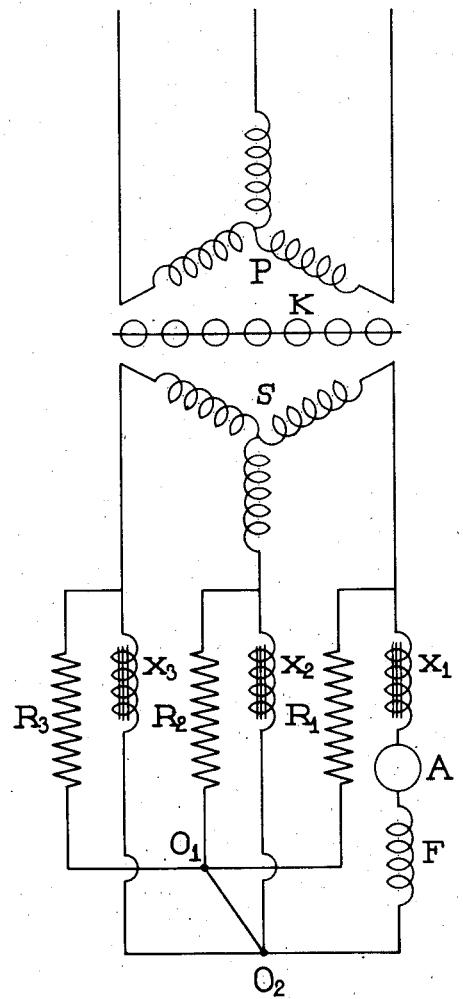
Inventor:
Tadaoki Yamamoto,
By Attys
Fraser, Durk & Myers Patented Feb. 26, 1924.

1,485,006

UNITED STATES PATENT OFFICE.

TADAOKI YAMAMOTO, OF TOKYO, JAPAN.

INDUCTION SYNCHRONOUS MOTOR.

Application filed March 2, 1923. Serial No. 622,392.

*To all whom it may concern:*

Be it known that I, TADAOKI YAMAMOTO, subject of the Emperor of Japan, residing at 1421 Takata, Takata-machi, county of Kitatoyoshima, Prefecture of Tokyo, Japan, have invented certain new and useful Improvements in Induction Synchronous Motors; and I do declare the following to be a clear, full, and exact description of the same, reference being had to the accompanying drawings, and to the characters of reference marked thereon, which form a part of this specification.

In the previous application of T. Yamamoto and M. Kawarada, Serial Number 570,305, dated June 23rd, 1922, an electrical machine was described which comprised in combination an induction motor, a series generator connected in cascade therewith, a reactor of high inductance, a high resistance squirrel cage winding, the said motor and the said generator being mechanically directly connected.

In this machine, as was fully explained in the specification, the squirrel cage winding and the secondary phase winding act in a selective manner in that at starting it is the former that acts primarily, while it is the latter that acts primarily at a high speed which is, however, lower than the synchronous speed. This action is caused by the gradual decrease of frequency in the secondary circuits.

In this invention, the high resistance secondary circuit, instead of being provided as a squirrel cage winding electrically independent of the secondary phase winding, is provided as a shunt to the reactor connected to the said secondary phase winding. The manner of operation is exactly the same as that of the machine described in the said previous application. At starting the secondary current, being of a higher frequency, will mainly pass through the high resistance provided in shunt to the high inductance, thus producing a high starting torque. As the speed goes up and the secondary frequency gradually diminishes, more and more current will flow through the said inductance and consequently through the series machine connected in cascade therewith, and the series machine will finally be excited to generate a current, supplying an exciting current to the secondary winding of the induction motor, synchronizing the aggregate automatically.

If desired, a squirrel cage winding also may be provided on the secondary core. By so doing the torque speed curve of the aggregate can be regulated as the case may require. For example, the starting torque may be made greater than the full load torque.

In the annexed drawing is illustrated one form of the invention.

Referring now more particularly to the characters of reference on the drawing, P designates a primary winding S a secondary winding of the induction motor. When the secondary winding S is provided on the rotor of the induction motor, its terminals are led out through suitably provided slip-rings and connected with the high inductances $x_1$ $x_2$ $x_3$ and the high resistances $R_1$, $R_2$, $R_3$, each of the said high inductances being connected in parallel to one of the said high resistances. To one of the said inductances, for example $x_1$, is connected in series therewith a series commutator generator comprising an armature A and a field winding F. This generator is preferably connected mechanically directly to the said induction motor.

In an aggregate formed in this manner if an alternating current is supplied to it on the induction motor side, the aggregate will start as an ordinary induction motor. At starting as well as while the speed is low, the secondary frequency, being comparable with the primary frequency, is still high, therefore, the secondary current will mainly pass through the resistances $R_1$, $R_2$, $R_3$, and the starting torque of the motor will be large. As the aggregate gains in speed and the secondary frequency gradually diminishes, more and more current will flow through the inductances $x_1$, $x_2$, $x_3$ and the series machine then through the resistances in parallel to them. When the secondary frequency goes down to a certain sufficiently low value, the magnetic field of the series wound machine will be established, and from this time on the series machine will operate as a direct current series generator supplying an exciting current to the secondary winding S of the induction machine converting same to a synchronous motor. All of this has been fully explained in the said previous application of Yamamoto and Kawarada.

The neutral point $O_1$ formed by the set of resistances $R_1$, $R_2$, $R_3$ and the neutral point $O_2$ formed by the set of inductances $x_1$, $x_2$, $x_3$ may either be electrically connected to each other or insulated one from the other. When these two points are connected to each other, as shown in the figure, the regulation of the exciting current, after the above mentioned synchronization is attained, may be effected by varying the resistance $R_1$ which is in parallel with the series generator. On the other hand, when the two neutral points are insulated one from the other, the regulation of the exciting current may be carried out by means of the resistance $R_1$, and the parallel connected resistances $R_2$ and $R_3$.

By providing a high resistance squirrel cage winding K on the secondary core of the induction machine in addition to the phase winding S, an effect equivalent to the triple secondary winding may be obtained, that is to say, any desired shape may be given to the speed-torque characteristic of the aggregate. For example, it will be possible to produce a machine whose starting torque is greater than the normal full load torque.

As desired, instead of inserting the field winding F of the series machine in one of the phases as shown in the figure, it may be uniformly distributed into all the secondary phases as in the said previous application.

Having now particularly described and ascertained the nature of my said invention and in what manner the same is to be performed I declare that what I claim is:—

1. An alternating current motor comprising in combination an induction machine, a series wound machine connected mechanically to the said induction machine, a reactor of high inductance in the secondary circuit of the said induction machine, a high resistance in parallel to the said reactor, the said series wound machine being connected in series with the said reactor but in parallel to the said high resistance.

2. An alternating current motor comprising in combination an induction machine, a series wound machine connected mechanically to the said induction machine, a reactor of high inductance in the secondary circuit of the said induction machine, a high adjustable resistance in parallel to the said reactor, the series wound machine being connected in series with the said reactor but in parallel to the said high resistance.

3. An alternating current motor comprising in combination an induction machine provided with a high resistance squirrel cage winding, a series wound machine connected mechanically to the said induction machine, a reactor of high inductance in the secondary circuit of the said induction machine, a high adjustable resistance in parallel to the said reactor, the said series wound machine being connected in series with the said reactor but in parallel to the said high resistance.

In witness whereof, I have hereunto signed my name in the presence of two subscribing witnesses.

TADAOKI YAMAMOTO.

Witnesses:
 HIDEO KAI,
 HIROSADA OYAMA.